United States Patent [19]

Maronian et al.

[11] Patent Number: 5,084,727
[45] Date of Patent: Jan. 28, 1992

[54] METHOD AND APPARATUS FOR PHOTOGRAPHIC EXPOSURE USING AN LCD PAD

[75] Inventors: Roupen H. Maronian; Scott F. O'Dell, both of Rochester, N.Y.

[73] Assignee: Eastman Kodak Company, Rochester, N.Y.

[21] Appl. No.: 631,545

[22] Filed: Dec. 21, 1990

[51] Int. Cl.[5] .............................................. G03B 27/72
[52] U.S. Cl. ........................................ 355/68; 355/69; 355/71
[58] Field of Search .................... 355/35, 38, 68–71, 355/74, 77, 40; 358/76, 80, 75.3; 346/160, 107 R, 108

[56] References Cited

U.S. PATENT DOCUMENTS

| | | | |
|---|---|---|---|
| 3,722,998 | 3/1973 | Morse | 355/71 |
| 3,758,207 | 9/1973 | Letzer | 355/80 |
| 3,926,520 | 12/1975 | Kaufman | 355/71 X |
| 3,936,172 | 2/1976 | McVeigh | 355/3 R |
| 4,180,813 | 12/1979 | Yoneda | 370/784 |
| 4,427,978 | 1/1984 | Williams | 340/784 |
| 4,613,207 | 9/1986 | Fergason | 350/331 R |
| 4,742,346 | 5/1988 | Gillette et al. | 340/793 |
| 4,782,348 | 11/1988 | Siegner | 346/107 R |
| 4,783,146 | 11/1988 | Stephany et al. | 346/160 |
| 4,809,064 | 2/1989 | Amos et al. | 358/76 |
| 4,830,468 | 5/1989 | Stephany et al. | 346/160 |
| 4,933,754 | 6/1990 | Reed et al. | 358/76 |
| 4,935,820 | 6/1990 | Patel et al. | 346/107 R |

FOREIGN PATENT DOCUMENTS 2158960 11/1985 United Kingdom .

Primary Examiner—L. T. Hix
Assistant Examiner—D. Rutledge
Attorney, Agent, or Firm—Heslin & rothenberg

[57] ABSTRACT

A technique for creating an image onto a photosensitive medium in a photoprinting process involves scanning a phototransparency for its densitometric information. Light from a lamp source is transmitted through an LCD pad onto a photosensitive medium to produce an image. The exposure of the image is regionally varied to achieve optimum results by activating individual LCD pixels to control the amount of light exposed to the photosensitive medium. A microprocessor calculates the activation pattern for the pixels based upon the densitometric information of the phototransparency.

20 Claims, 3 Drawing Sheets

METHOD AND APPARATUS FOR PHOTOGRAPHIC EXPOSURE USING AN LCD PAD

BACKGROUND OF THE INVENTION

This invention relates generally to the field of photographic printing and more particularly to a method and apparatus for photographic exposure in a printer utilizing a liquid crystal display (LCD) pad.

In conventional photographic printing, a negative is typically scanned by a light sensor, such as a charge coupled device, which measures the light transmitted through various locations of the negative. Densitometric information from the negative is processed, converted and eventually fed to an exposure control computer which calculates the exposure by computing average red, green and blue exposure levels for the entire image. The computer controls a light source, typically a lamp house, including a shutter and light subtractive filtering means. The negative is positioned at a print station located between the light source and the photosensitive paper thereby allowing light to pass through the negative to produce the proper image on the photosensitive paper. The computer begins the exposure process by activating the light source and controlling the exposure time for the red, green and blue colors. If exposure for a certain color has occurred for the calculated period of time, the computer controls a light subtractive, or additive filter which is placed within the light path to cease, or commence exposure of a specific color. After the exposure time for each of the red, green and blue colors has expired, the print is fully developed.

One disadvantage to the conventional photographic exposure technique, is that the exposure level (time, intensity or a combination of both) for each color is the same throughout the entire negative regardless of the variation in densities within the negative. Since it has not been possible to vary the exposure level to accommodate different densities at locations within the negative, the exposure control computer calculates an average exposure time for each color of light. This may affect the quality of the exposure, especially when different locations on the negative contain different density or transmittance levels. In this situation, an unbalanced exposure may be created resulting in a print containing locations which are overly dark and/or overly light. This often occurs when a scene contains a background which is either darker or lighter than the foreground; for example, when a dark subject is located in the middle of a light background which surrounds the subject, or vice versa.

Conventional photographic exposure systems are not capable of initiating different exposure levels for individual locations on the negative (i.e., the background and the foreground). An average exposure time for the entire image scene on the negative is calculated based upon the transmittance and density levels of individual locations. Using a uniform intensity lamp, the exposure levels across the entire print cannot be varied to accommodate for different density levels throughout the negative because the duration of the light is uniform throughout the entire negative. As a result, the proper contrast between the background and foreground is not obtained thereby impairing the quality of the exposed print.

It is therefore an object of the present invention to provide a method and apparatus for creating an image onto a photosensitive medium which is capable of varying the exposure level at different areas of the photosensitive medium to accommodate for extreme variations in density on the negative.

It is also an object of the present invention to provide method and apparatus for creating an image onto a photosensitive medium which contains a more accurate representation of contrast within the imaged scene.

It is also an object of the present invention to provide a method and apparatus for creating an image onto a photosensitive medium which alleviates the necessity for calculating average density levels and exposure times for different colors within the image.

It is also an object of the present invention to provide a method and apparatus for creating an image onto a photosensitive medium which is capable of varying the exposure level at different areas of the photosensitive medium by varying area exposure times.

SUMMARY OF THE INVENTION

The aforementioned objects, features and advantages of the invention are obtained through implementation of the method and apparatus for creating an image onto a photosensitive medium in accordance with the present invention.

The method for creating an image onto a photosensitive medium includes scanning a phototransparency to obtain densitometric information regarding locations within the phototransparency, transmitting light through an LCD display pad having a matrix array of pixels onto a photosensitive medium, each pixel corresponding to an area on the photosensitive medium and a location within the phototransparency thereby resulting in an array of areas on the photosensitive medium and an array of pixels correlated to an array of locations on the phototransparency, assigning areas of the photosensitive medium an exposure level based upon the densitometric information of the corresponding locations within the phototransparency, and activating each pixel within the LCD array in such a manner so as to obtain the assigned exposure level at the corresponding area of the photosensitive medium thereby controlling the amount of light allowed to pass through the LCD array at each pixel to create an image on the photosensitive medium.

The method may also include generating a signal representative of the densitometric information and converting the signal into digital density level values.

The method may include categorizing each pixel based upon the digital density level of its corresponding location within the phototransparency where each category encompasses a range of density levels, and assigning each category of pixels a predetermined activation value, wherein each pixel is placed within a category and each pixel within the same category is assigned the same activation value. Assigning each pixel an activation value may be accomplished by assigning each pixel an activation time indication of the duration that the pixel will remain on.

The method may also include sorting the pixel categories according to their activation times, and activating each pixel within a category simultaneously to allow similar exposure on the photosensitive medium to form portions of an image thereon, and successively activating pixels in each category until each pixel has been activated to produce an entire image on the photosensitive medium. The number of density level categories may be based upon the number of bits used to convert the density level values into digital density level values. If an eight bit convertor is used, the number of density level categories may be two hundred and fifty six. The method may also include measuring the transmittance values at each location and logarithmically amplifying a signal representative of the transmittance values. Pixels having corresponding locations assigned identical exposure times may be activated simultaneously.

The apparatus for creating an image on a photosensitive medium may include means for assigning areas on a photosensitive medium an exposure level, said exposure level being derived from a signal representative of the densitometric information of a phototransparency; an LCD display pad having a matrix array of pixels, each pixel corresponding to a location on the phototransparency and an area on the photosensitive medium, said pixels being capable of being activated based upon the exposure levels assigned each area of the photosensitive medium to limit the amount of light exposed to a photosensitive medium, the LCD display pad being operatively connected to the means for assigning each area an exposure level and being capable of receiving a signal which dictates the activation of the pixels; a light source; and means for supporting a photosensitive medium. The light source, LCD pad and means for supporting a photosensitive medium are oriented to enable the LCD display pad to be within the light path between the light source and photosensitive medium whereby light from the light source may pass through the LCD display pad and exposure of the areas of the photosensitive medium varied when corresponding pixels are activated.

The apparatus may also include means for converting transmittance values at locations on the phototransparency into densitometric information of locations on the image. An analog to digital converter capable of converting analog density level signals into digital density level values may also be included in the apparatus and the means for assigning each location an exposure level may include a microprocessor. Also, a scanner for determining the transmittance levels at locations on a phototransparency may be operatively interfaced with the microprocessor to determine the densitometric information.

The microprocessor may be capable of controlling the activation of each pixel thereby controlling the amount of light which passes through the LCD pad and the exposure of the areas on the photosensitive medium which form an image. The microprocessor may also be capable of activating pixels having corresponding areas on the photosensitive medium assigned the same exposure level for the same length of time, capable of activating pixels having corresponding areas on the photosensitive medium assigned the same exposure level simultaneously, and/or capable of activating pixels in order of their corresponding areas descending exposure levels.

BRIEF DESCRIPTION OF THE DRAWINGS

The invention, together with its objects, advantages, and features will be better understood through consideration of the following detailed description in conjunction with the drawings, in which like reference numerals represent like elements, and in which.

DETAILED DESCRIPTION

Figure 1:
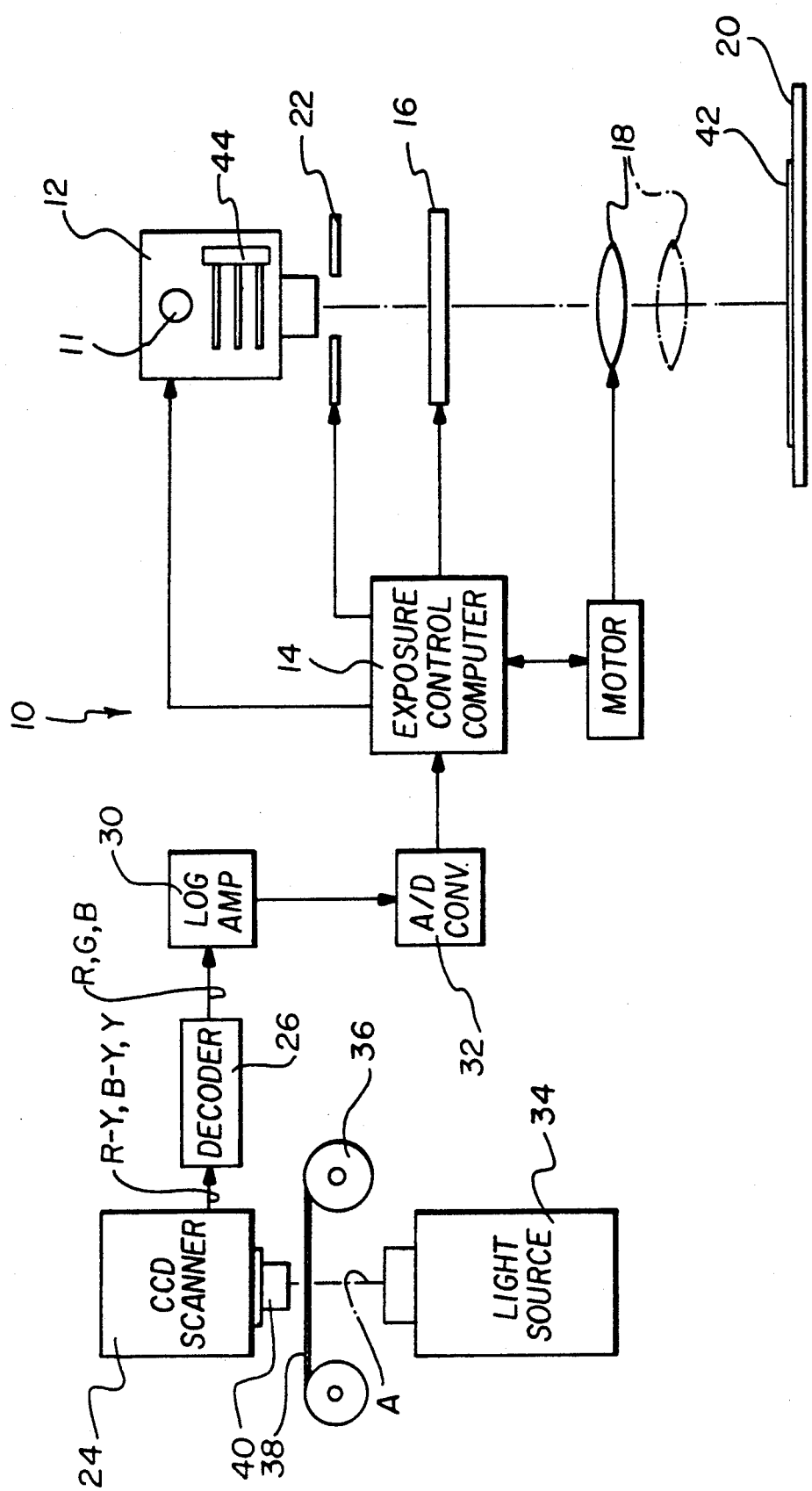
FIG. 1 is a schematic representation of the apparatus for creating an image onto a photosensitive medium in accordance with the present invention.

Referring now to FIG. 1, a photographic printing system 10 according to the present invention includes a lamp house 12, an exposure control computer 14, an LCD display pad 16, color balancing filters 44, a print lens 18, a print station 20, a shutter 22, a scanner 24, a decoder 26, a logarithmic amplifier 30, an analog to digital converter 32, a scan light source 34, and a film negative advancer 36.

The invention operates to print photographs using the LCD pad as a means for controlling the exposure levels at different locations throughout the image. A negative is scanned by a scanner which measures densitometric information in the form of transmittance values at area locations of the image. Signals from the scanner are eventually received by the exposure control computer 14 which activates the lamp house 12, shutter 22, balancing filters 44, LCD 16 and print lens 18 to control and create an image printed on a photographic medium usually photographic paper.

Film negative 14 is placed within a film transport means 36 which is typically a rotatable, X-Y translatable support table such as that shown and described in U.S. Pat. No. 4,485,406, assigned to the assignee of the present invention, and incorporated herein by reference. The scan light source 34 is positioned to direct light through the film negative 38 to enable the scanner 24 to measure the transmittance value characteristics of the negative 38. The scanner 24, negative 38, and light source 34 are defined along a light path axis A. A lens 40, such as the Chinon LP036KD zoom lens is disposed between the scanner and the negative along axis A to properly focus the light generated from light source 34 and transmitted through film negative 38.

Scanner 24 comprises, for example, an array 58 of photosensitive elements (not shown) such as photo cells or solid state charge coupled devices (CCD). In the preferred embodiment, the scanner 24 comprises a color video camera employing a solid state imaging device such as a Sony camera Model XC-117. Alternatively, a Sony DXC3000 camera scanner which can provide three distinct R, G, B raw signals, which need not be decoded, directly from the camera may be used. Using the XC-117 CCD scanner in the present invention results in the scanner 24 transmitting color difference signals R-Y, B-Y and Y. These color difference signals are transmitted to a decoder 26 which converts the color difference signals R-Y, B-Y, Y to R, G, and B video signals as is well known in the art. The video signals are then transmitted into a logarithmic amplifier 30. The resultant logarithmically amplified signals are then converted into digital signals by an analog to digital convertor 32 which transmits the digital signals to the exposure control computer 14. The decoder circuit 26, log amplifier circuit 30 and analog to digital convertor 32 are commercially available devices which are well known in the art.

The exposure control computer may comprise any of a variety of commercially available microprocessors which are well known in the art. Typically, however, an eight bit microprocessor such as Intel's 86/30 SBC microprocessor would be sufficient for use in the present invention.

The circuitry for converting the output of the video camera to LOG (R, G, B) density signals, by measuring the density of discrete picture elements within a negative by a photosensitive device, can be accomplished through various different means which are also well known to those skilled in the art. Accordingly, the invention is not limited to those embodiments specified herein.

The exposure control computer 14 is interfaced with the lamp house 12 which may comprise any conventionally known lamp house. For example, the lamp house disclosed in U.S. Pat. No. 4,774,551, assigned to the assignee of the present invention and incorporated herein by reference, may be implemented in the present invention. Balancing filters 44 comprise Red, Green and Blue filters which allow their respective colors of light transmitted by the light source 11 in the lamp house 12 to pass therethrough. The spectral peak of each balancing filter should match the spectral density peak of the photosensitive medium to allow for optimum image development on the print during exposure.

The lamp house 12 transmits light therefrom through a shutter 22, through LCD display pad 16, through print lens 18 and onto photosensitive paper 42 on print station 20. The exposure control computer 14 controls the shutter 22, the LCD display pad 16 and motor 44 for adjusting the position of print lens 18. The exposure control computer 14 also controls the activation of the light transmitted by the lamp house 12 and the activation of individual pixels within the LCD display pad to produce a printed image on the photographic paper 42. The exposure control computer 14 activates each individual element within the printing apparatus based upon the signals received from the negative scanning apparatus.

The LCD display pad 16 includes a matrix array of LCD pixels. For example, the LCD display pad used in the Kodak Data Show System has a resolution of 640×200 pixels within a display area of 300 mm×330 mm and may be used within the present invention. The individual LCD pixels are physically between two glass plates which form the outer surfaces of the display pad and operate in either an ON or OFF state using conventional 110 volts A/C power at 60 hz. The quality of the prints will be improved with the use of higher resolution LCD display pads because the number of locations on the transparency corresponds to the number of pixels. Accordingly, use of the highest resolution LCD display pads available are preferred in the present invention. Each pixel corresponds to a location within the scanned image so that when a pixel is electrically activated, light is prevented from passing therethrough onto the photosensitive medium. Therefore, by activating each pixel for a specified period of time the length of the exposure time for each location can be controlled. By varying the activation of individual pixels it is possible to regionally varying the exposure level throughout the print. In this manner, the exposure of the image onto a photosensitive paper can be facilitated by transmitting the light from the lamphouse 12 directly through the LCD pad without the necessity of the printing light being transmitted through the negative.

Operation of the system is accomplished by inputting a film negative 38 into the photographic printing system 10 as depicted in FIG. 1. The film negative is transported via the advancer 36. The system may commence its scanning procedure by activation of a control button (not shown) on the display pad to activate light source 34 and CCD scanner 24. As previously described, the CCD scanner reads densitometric information at areas of the image on the negative. Each pixel on the LCD display pad corresponds to a particular location on the film negative 38 so that the CCD scanner will determine the transmittance levels at each particular location of the negative. Using a conventional CCD scanner, three color difference signals R-Y, B-Y, Y are then decoded by the decoder into R, G, B video signals which are logarithmically amplified by the log amplifier 30 and converted into digital density values by the analog to digital converter 32. The resultant signal transmitted into the exposure control computer 14 represents digital values for each individual location of the image on the film negative 38 which also corresponds to a pixel location on the LCD display pad 16.

Figure 2:
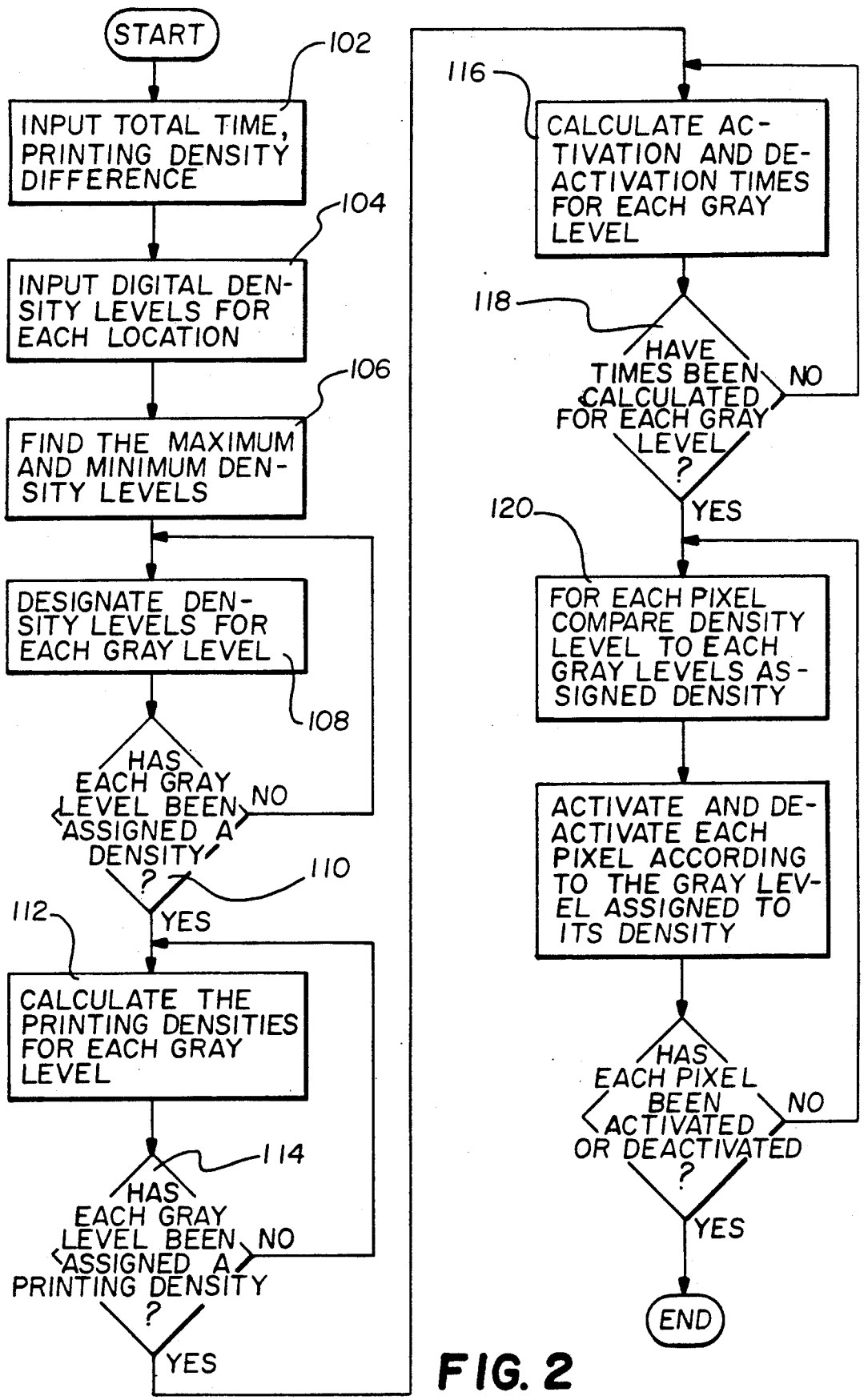
FIG. 2 is a flow diagram of a computer program which may be implemented within the method and apparatus for creating an image onto a photosensitive medium in accordance with the present invention.

In accordance with the flow diagram of FIG. 2, the operation of the system will now be described. For simplicity, the flow diagram and the following description are for one color channel. However, the system can be used in conventional color photoprinting by performing the technique on each of the three conventional color channels. The process defined in the flow diagram can be easily repeated for each color channel. The microprocessor calculates the activation and deactivation times for each LCD pixel based upon the digital density levels of the negative's locations which correspond to LCD pixels, and based upon the number of gray levels the system may accommodate (i.e., 256 if the 8 bit microprocessor is used). Each gray level represents a different exposure level which the LCD pixels are capable of generating.

In the first step 102, the total exposure time (i.e. the maximum amount of time the photographic paper is exposed to light from the light source) and printing density difference (described infra) are inputted into the computer. In the next step 104, the digital density level array for the negative being scanned (i.e., DigDens (a,b) where a and b represent the horizontal and verticle positions, respectively) is also received by the computer from the analog to digital converter. In the next step 106, the computer finds the maximum and minimum density levels from the inputted array of digital density levels. The maximum and minimum density levels are used in the next step 108 to correspond digital density levels to particular gray levels. These density levels may be easily obtained by the equation:

$$\text{ImageDens}(g) = (\text{Maximum Digital Density} - \text{Minimum Digital Density}) g \times 1/GL$$

Where
GL represents the total number of gray levels (e.g., 256)
and g represents the individual gray level.

Once the digital density levels have been matched to their gray level, the printing densities for each gray level are calculated in the following step 112. The printing densities are calculated according to the relationship:

$$Pdens(g) = g \times PD \times 1/GL$$

Where PD is the printing density difference between the pixel LCD ON state and pixel LCD OFF state.

Although PD is a constant, it must be experimentally obtained prior to operation of the system and is dependent upon the illuminant spectral radiance, the LCD spectral transmittance in both the ON and OFF states, the filters used and the spectral sensitivity of the photopaper. Although various methods of calculating the printing density difference are well known in the art. One particular technique for calculating the printing density difference for the present invention is discussed infra.

In a following step 116, activation times, defined by a pixel's time-ON and a time-off necessary for a pixel to generate the appropriate gray levels, are calculated. An example of source code which can be used to calculate the times is as follows:

```
TimeOn(1) = TotalTime
TimeOff(1) = TotalTime - TimeOn(1)
FOR g = 2 to GL
    Delta = Pdens(g) - Pdens(g-1)
    TimeOn(g) = (10/delta)*TimeON(g-1) +
        ((10/delta)-1)*TotalTime/((10/PD)-1)
    TimeOff(g) = TotalTime - TimeOn(g)
```

NEXT g Where TotalTime represents the total amount of time the shutter is opened. As a result, the computer now has computed and stored in memory the activation times as a function of gray level, the printing densities as a function of gray level and the digital densities as a function of gray level.

In a following step the computer searches for all pixels having corresponding locations with density levels which are equal to the density level corresponding to gray level 1 (i.e., search for all density levels which have a value of ImageDens(1)) and activate them at the times calculated for gray level 1 and deactivate them at the time calculated for gray level 1. This searching process is continued for each gray level and a sample of source code which can perform this function is as follows:

```
Start = TIMER
FOR g = 1 to GL
    TSTEP = TimeOFF(g)
    Clock = TIMER - Start
    WHILE Clock < TSTEP
        FOR a = 1 to M
        FOR b = 1 to N
            If DigDens(a,b) = ImageDens(g) + Minimum
            Digital Density
                LOCATE & TurnOFF pixel a,b
            NEXT b
        NEXT a
        Clock = TIMER - Start
    WEND
```

Next g Where TIMER represents a clock function of the microprocessor, M is an integer equal to the number of vertical rows of pixels and N is an integer equal to the number of horizontal rows of pixels. Instead of starting with the LCD pixels ON and incrementally turning pixels OFF, the system can be operated with the pixels OFF and then incrementally turning the pixels ON.

Figure 3:
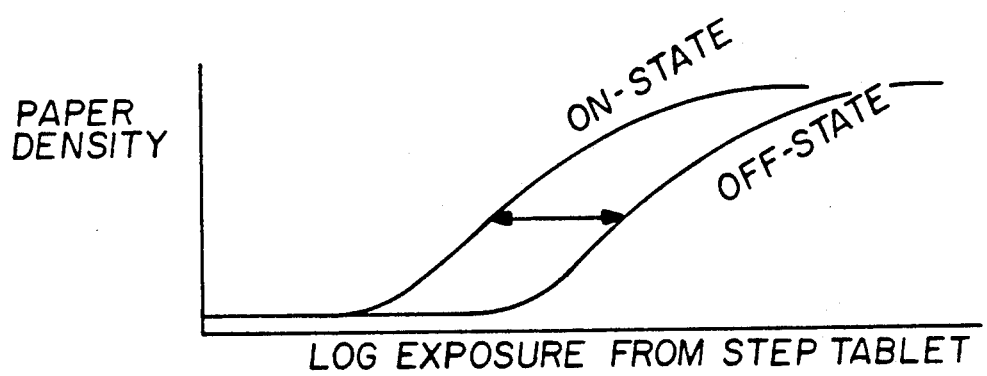
FIG. 3 is a graphic representation representative of the technique used to determine the printing density difference useable in the present invention.

The printing density difference between the LCD ON state and LCD OFF state can be obtained by setting up the entire system using the designated filters and photopapers. The system can be run through one exposure with the LCD pad in the ON state using a neutral density step tablet, as is well known in the art, for a given period of time to generate an H&D curve for the ON state. This step should be repeated with the LCD off for the same amount of time to generate an H&D curve for the OFF state. The speed difference at any defined speed point will be defined as the printing density difference between the on and off state for that particular system. In FIG. 3, a graphical illustration of the printing density difference is shown. Note that the printing density difference represents Log exposure.

In accordance with the present invention, the printing system 10 involves a scan step implemented by the scanning apparatus 100 and a print step implemented by the printing apparatus 200. The information obtained through the scan step is processed by the exposure control computer 14 to control a print step so that the scan step can be performed in a remote location from the print step. For example, the scanning of a negative can occur at one location and the resultant signal obtained from the analog to digital converter can be stored in a memory means or transmitted along communication lines to eventually be used by a control computer at a different location which may control the printing process at the different location. Accordingly, since negatives are not needed in the print step, they can be scanned at one centralized location while the photographic prints may be processed at many remote locations.

Although the invention has been described as applied to the development of color photographs, it is apparent that its use is not limited thereto. The invention may produce black and white prints without the need for color balancing filters, the processing of R, G, and B signals and/or the necessity of running the printing step for each of the R, G and B colors.

While the invention has been described with respect to the embodiment depicted herein, it will be apparent to one skilled in the art that various modifications may be made to the systems depicted herein. For example, a film positive rather than a film negative may be scanned to produce a photographic print and various methods of scanning the negative, or positive for color densitometric information and converting the signals from the scanner to digital signals may be used within the present invention. Many different systems can be employed for reading the densitometric information from the negative and converting the information into a signal representative of the necessary exposure time and/or intensity. Also, various types of lamp houses 12 which are also well known in the art may be utilized in the present invention to control the exposure time created by the activation of individual LCD pixels within the LCD display pad. It will be appreciated that the invention is not limited to these or other particular systems notwithstanding the embodiments depicted herein. Various modifications, changes, variations, substitutions and equivalents may be utilized by one skilled in the art without departing from the spirit and scope of the invention as defined in the following claims.

We claim:

1. A method for creating an image onto a photosensitive medium comprising:
   scanning a phototransparency to obtain densitometric information regarding locations within the phototransparency;

generating a signal representative of the densitometric information and converting the signal into digital density level values;

transmitting light through an LCD display pad having a matrix array of pixels onto a photosensitive medium, each pixel of the LCD display pad corresponding to an area on the photosensitive medium and a location within the phototransparency thereby resulting in an array of areas on the photosensitive medium and an array of pixels in the LCD pad corresponding to an array of locations on the phototransparency; and categorizing each pixel based upon the digital density level of its corresponding location within the phototransparency, each category encompassing a range of density levels;

assigning each category of pixels a predetermined activation value, each pixel within the same category being assigned the same predetermined activation value wherein each pixel is assigned an activation value representative of an exposure level of the corresponding area on the photosensitive medium.

2. The method for creating an image onto a photosensitive medium according to claim 1 wherein assigning each pixel an activation value comprises assigning each pixel an activation time wherein each pixel is activated for its assigned activation time in order to obtain the exposure levels of the corresponding areas on the photosensitive medium.

3. The method for creating an image onto a photosensitive medium according to claim 2 further comprising:

sorting the categories of pixels according to their activation times;

activating each pixel within a category of pixels simultaneously to allow similar exposure on the photosensitive medium to form portions of an image thereon, each exposed portion corresponding to locations within the phototransparency; and successively activating pixels in each category until each pixel has been activated to produce an image on the photosensitive medium corresponding to the scanned image.

4. The method for creating an image onto a photosensitive medium according to claim 1 or 3 further comprising measuring the transmittance values at each location and logarithmically amplifying a signal representative of the transmittance values.

5. The method for creating an image onto a photosensitive medium according to claim 3 wherein the number of categories of pixels is based upon the number of bits used to convert the densitometric information into digital density level values.

6. The method for creating an image onto a photosensitive medium according to claim 5 wherein the number of categories is two hundred and fifty six.

7. A method for creating an image onto a photosensitive medium according claim 1 further comprising simultaneously activating pixels assigned identical activation values.

8. A method for creating an image onto a photosensitive medium according to claim 5 further comprising activating pixels assigned the largest activation time simultaneously, subsequently activating pixels assigned an activation time which is of a shorter duration by an activation time increment and subsequently activating pixels having shorter activation times in a similar manner and thereafter activating pixels by order of descending activation times until the pixels with the shortest exposure times have been activated.

9. The method for creating an image onto a photosensitive medium according to claim 8 further comprising activating a shutter to prevent light from transmitting onto the photosensitive medium after a predetermined maximum exposure time has elapsed.

10. A method for creating an image onto a photosensitive medium comprising:

scanning a phototransparency to arrive at a signal representative of the transmittance at locations of the phototransparency image, each location corresponding to a pixel of an LCD display matrix array pad;

converting the signal into digital density values for specific locations of the image;

sorting the density values into categories of preselected density value ranges;

assigning each category an activation time;

transmitting light from a light source through the LCD display pad and onto a photosensitive medium;

assigning each pixel the activation time of the category that its corresponding location of the scanned phototransparency has been sorted into; and activating each pixel for a period of time representative of its activation time to control the light transmitted through the LCD pad and thereby create an image on the photosensitive medium.

11. An apparatus for creating an image onto a photosensitive medium comprising:

a scanner for scanning a phototransparency to obtain densitometric information regarding locations within the phototransparency;

means for generating a signal representative of the densitometric information and converting the signal into digital density level values;

a LCD display pad having a matrix array of pixels therein, each pixel of the LCD display pad corresponding to an area of a photosensitive medium at a location within the phototransparency thereby resulting in an array of areas on the photosensitive medium and an array of pixels in the LCD pad corresponding to an array of locations on the phototransparency;

means for transmitting light through an LCD display pad and onto the photosensitive medium;

means for categorizing each pixel based upon the digital density level of the corresponding location within the phototransparency wherein each category encompasses a range of density levels;

means for assigning each category of pixels a predetermined activation value wherein each pixel within the same category is assigned the same predetermined activation value and wherein each assigned activation value is representative of an exposure level of the corresponding area on the photosensitive medium; and means for activating each pixel within the LCD array at its predetermined activation value to obtain the exposure level at the corresponding area of the photosensitive medium thereby controlling the amount of light allowed to pass through the LCD array at each pixel to create an image on the photosensitive medium representative of the phototransparency.

12. The apparatus for creating an image onto a photosensitive medium according to claim 11 wherein the means for assigning areas on a photosensitive medium an exposure level comprises means for converting transmittance values at locations of the phototransparency into densitometric information of locations on the image.

13. The apparatus for creating an image onto a photosensitive medium according to claim 12 wherein the means for converting the signal into digital density level values comprises an analog to digital converter.

14. The apparatus for creating an image onto a photosensitive medium according to claim 13 wherein the means for assigning each area an exposure level comprises a microprocessor.

15. The apparatus for creating an image onto a photosensitive medium according to claim 14 wherein the microprocessor is capable of assigning each area an exposure level based upon the digital density level values associated with the corresponding locations of the phototransparency.

16. The apparatus for creating an image onto a photosensitive medium according to claim 15 wherein the microprocessor is capable of controlling the activation of each pixel thereby controlling the amount of light which passes through the LCD pad and the exposure of the areas on the photosensitive medium which form an image.

17. The apparatus for creating an image onto a photosensitive medium according to claim 16 wherein the microprocessor is capable of activating pixels, having corresponding areas on the photosensitive medium which are assigned the same exposure level, for the same length of time.

18. The apparatus for creating an image onto a photosensitive medium according to claim 17 wherein the microprocessor is capable of activating pixels, having corresponding areas on the photosensitive medium assigned the same exposure level, simultaneously.

19. The apparatus for creating an image onto a photosensitive medium according to claim 18 wherein the microprocessor is capable of activating pixels in order of the descending exposure levels of their corresponding areas on the photosensitive medium.

20. A method of creating a photographic print comprising:

scanning one of a photographic negative and positive to obtain densitometric information regarding locations within the one of the photographic negative and positive;

assigning areas of a photosensitive printing medium an exposure level based upon the densitometric information of corresponding locations within one of the photographic negative and positive;

transmitting light through an LCD display pad having a matrix array of pixels onto the photosensitive printing medium without transmitting the light through the one of the photographic negative and positive, each pixel of the LCD display pad corresponding to an area on the photosensitive printing medium and a location within the one of the photographic negative and positive thereby resulting in an array of areas on the photosensitive printing medium and an array of pixels in the LCD pad corresponding to an array of locations on the one of the photographic negative and positive;

activating each pixel within the LCD array to obtain the assigned exposure level at the corresponding area of the photographic printing medium thereby controlling the amount of light allowed to pass through the LCD array at each pixel to create an image on the photographic printing medium representative of the phototransparency.

* * * * *